Oct. 12, 1965     G. A. NEYHOUSE ETAL     3,211,982
SINGLE-PHASE MOTOR AND OPERATING METHOD
Original Filed April 6, 1959                    4 Sheets-Sheet 1
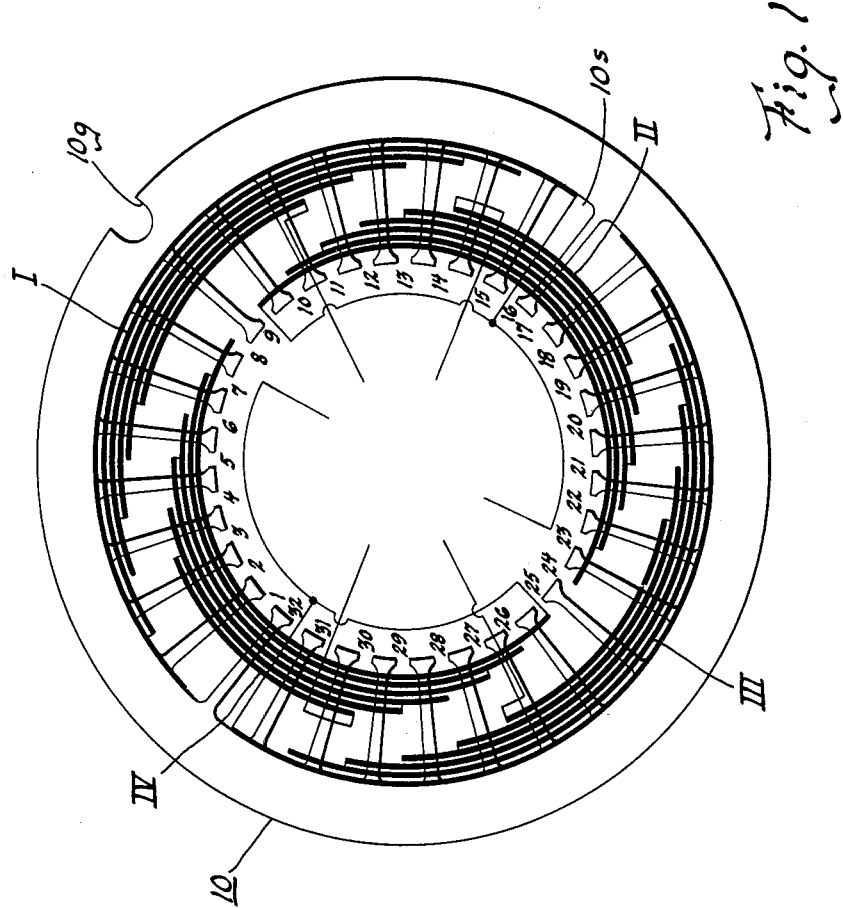
INVENTORS
George A. Neyhouse
Jack W. Savage
Ralph K. Shewmon
BY
Albert H. Reuther
THEIR ATTORNEY INVENTORS
George A. Neyhouse
Jack W. Savage
Ralph K. Shewmon
BY
Albert H. Reuther
THEIR ATTORNEY

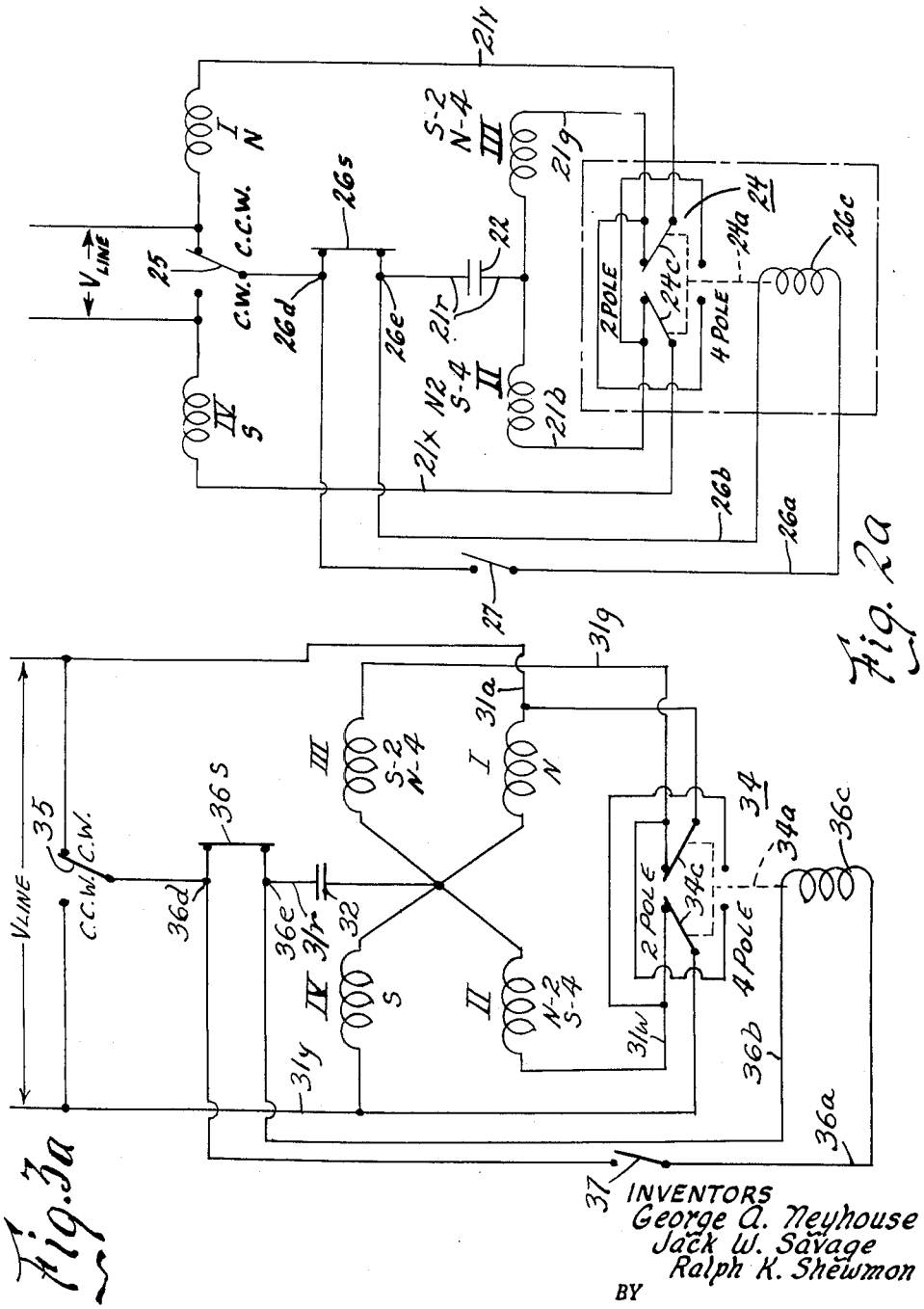

Oct. 12, 1965  G. A. NEYHOUSE ETAL  3,211,982
SINGLE-PHASE MOTOR AND OPERATING METHOD
Original Filed April 6, 1959  4 Sheets-Sheet 4

INVENTORS
George A. Neyhouse
Jack W. Savage
Ralph K. Shewmon
BY
Albert H. Reuther
THEIR ATTORNEY

United States Patent Office 3,211,982
Patented Oct. 12, 1965

3,211,982
SINGLE-PHASE MOTOR AND OPERATING METHOD
George A. Neyhouse, Dayton, and Jack W. Savage and Ralph K. Shewmon, Centerville, Ohio, assignors to General Motors Corporation, Detroit, Mich., a corporation of Delaware
Original application Apr. 6, 1959, Ser. No. 804,223. Divided and this application Mar. 12, 1962, Ser. No. 178,803
2 Claims. (Cl. 318—221)

This invention relates to dynamoelectric machines, and particularly, to a multi-speed motor.

This is a division of copending parent application Serial No. 804,223—Neyhouse et al., filed April 6, 1959, now abandoned though re-filed as co-pending application Serial Number 210,258—Neyhouse et al., filed July 16, 1962, belonging to the assignee of the present invention.

An object of this invention is to provide a new and improved motor utilizing a number of individual equally-spaced wound partial portions collectively to form electrical poles, all being electrically connectable and energizable to be active in every mode of operation.

Another object of this invention it to provide a motor stator winding having a number of individual portions generally totalling the least common multiple $m$ of each of the $n$ numbers of electrical poles at which the motor is to operate, each wound portion extending an arcuate distance equal to or greater than $360°/m$ and being connectable into $n$ groups, each group consisting of $m/n$ adjacent wound portions of like polarity to effect a pole, such a system being equally usable in both single and polyphase machines.

Another object of this invention is to provide a single-phase motor having plural wound portions of a single winding connectable to form two and four electrical poles relative to a stator iron assembly and adaptable to have conducting material of the winding active at all times for operations including two pole start, two pole run and/or four pole run attainable by proper orientation of current flow through conducting material and in which selected wound portions are subjected to addition and removal of phase shifting means such as an inductance, capacitance or resistance and capacitance for starting and running operations respectively.

A further object of this invention is to provide a method of starting a motor having a winding of which all conducting material is always active so that for starting at minimum electrical pole ratio $n$ this number of poles $n$ can be taken to be parallel wound but connectable in series branches whereby the turns ratio of the wound portions subjected to a phase shifting means is doubled for starting duty.

Another object of this invention is to provide a method of starting a motor having a winding of which all conducting material is always active using parallel conductors for at least a portion of the motor conductors so as to permit variation of strength of power or torque of the motor by switching of electrical connections of wound portions forming the winding.

Another object of this invention is to provide a dynamoelectric machine and operating methods whereby all conducting material of a winding is active always and adapted to be connectable to obtain two to one speed and electrical pole ratio due to predetermined placement and tapping of the conducting material relative to a stator iron assembly to get multispeed running and starting operation.

Further objects and advantages of the present invention will be apparent from the drawings wherein preferred embodiments of the present invention will be shown.

In the drawings:

FIGURE 1 is a plan view of a stator and coil assembly along with diagrammatic representation of connections relative thereto for a thirty-two slot, six lead, nonreversible series wound two-four pole dynamoelectric machine in accordance with the present invention.

Slight variation of the FIGURE 1 diagrammatic representation of connections relative to a thirty-two slot, six lead, nonreversible series wound two-four pole dynamoelectric machine can provide for a thirty-two slot, seven lead, reversible series wound two-four pole dynamoelectric machine in accordance with the present invention.

FIGURE 2a illustrates a control circuit for use with the machine made reversible by seven lead connection thereto.

Figure 3:
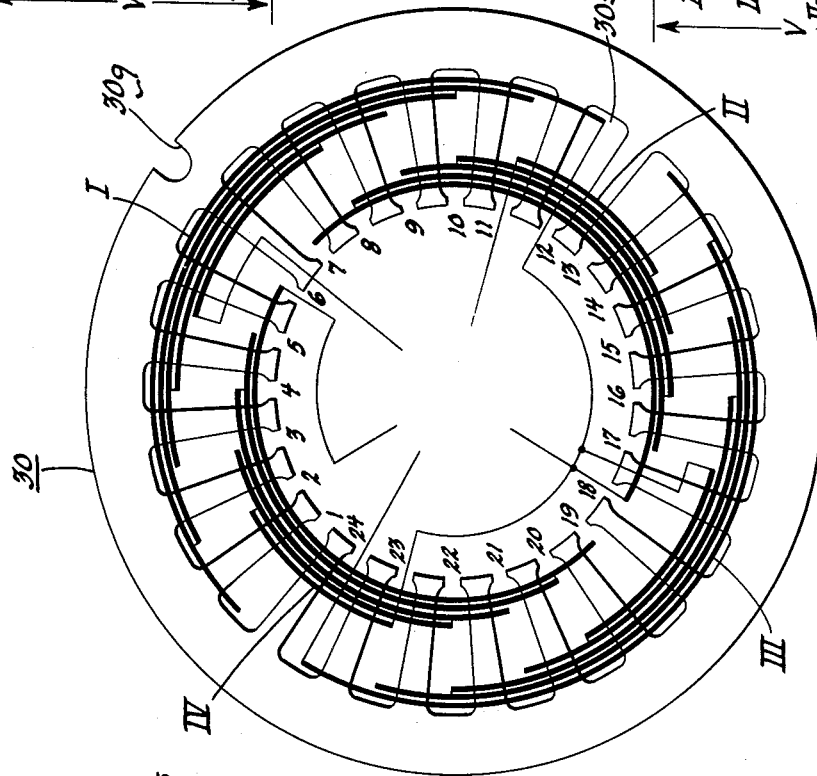

FIGURE 3 is a plan view of a stator and coil assembly along with diagrammatic representation of connections relative thereto for a twenty-four slot, five lead, reversible parallel wound two-four pole dynamoelectric machine in accordance with the present invention.

FIGURE 3a illustrates a control circuit for use with the machine of FIGURE 3.

Figure 4A:
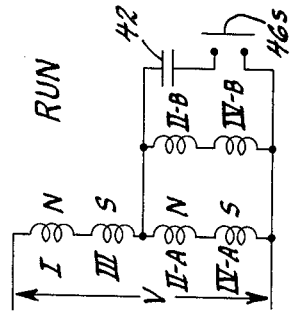
Figure 4:
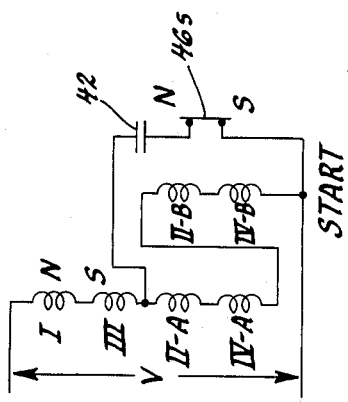

FIGURES 4 and 4a illustrate diagrammatically another embodiment for starting and running connections, respectively, for a dynamoelectric machine having a winding in accordance with the present invention.

Figure 5:
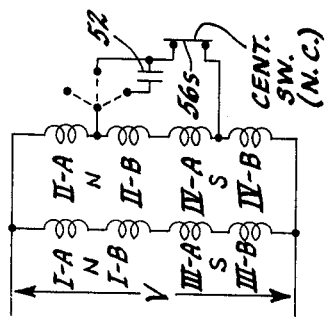

FIGURE 5 illustrates diagrammatically another control circuit for establishing running and starting connections for a dynamoelectric machine having a winding in accordance with the present invention.

Figure 6:
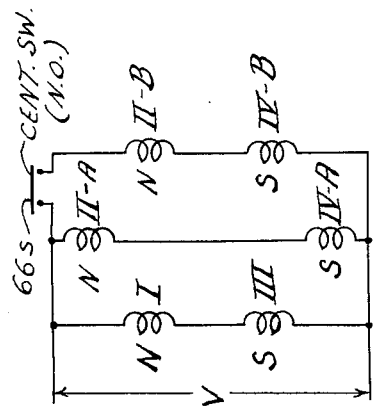

FIGURE 6 illustrates diagrammatically a further modified control circuit for establishing running and starting connections for a dynamoelectric machine having a winding in accordance with the present invention.

A need exists in the appliance industry for a multi-speed motor or dynamoelectric machine requiring a minimum of materials which can be assembled to form a compact unit requiring less space than previously known multi-speed motors. For example, appliances such as laundry equipment and air conditioners can advantageously use a multi-speed motor. For laundry equipment such as a washing machine having a program of operation including various cycles at differing speeds, there can be a saving in time and expense in manufacture and operation of the laundry equipment. Benefits of this saving in time, labor and expense accrue to both the manufacturer and to the customer. Previous multi-speed motors have been found expensive due to a cost premium in labor and material involved in installing an auxiliary high speed winding along with a normal low speed running winding and necessary starting windings. Also, on appliances such as a washing machine there are various cycles of operation during which a motor is required to handle different loads involving differences in power and torque. However, appliance manufacturers are reluctant to use two speed motors requiring cost premium in labor and material due to installation of an auxiliary high speed winding along with a normal low speed running and starting winding. The present invention provides a new multi-speed motor having a winding relative to which tap-in leads and electrical connections are established for differing modes or methods of operation whereby a motor having a single inserted winding can be made to start and finally run at either two or four pole speeds.

A dynamoelectric machine or motor in accordance with the present invention has only one winding comprising a number of wound coil portions from which predetermined numbers of electrical poles can be formed as desired by establishing wiring connections relative to the coil portions as will be described in further detail below.

The motor of the present invention can be used as a multiple speed motor without discrete first and second primary or running windings and/or without discrete first and second auxiliary or starting windings. To effect saving in cost of material and labor and also to permit multi-speed operation, a single winding is provided made up of multiple coil portions which are adapted to be connected in circuits wherein all conducting material of the single winding is active for all modes of operation of the multi-speed motor. Each wound coil portion may consist of one or more coils mutually located either concentrically or overlapping. As illustrated in FIG. 1, a dynamoelectric machine or motor in accordance with the present invention includes a stator generally indicated by numeral 10 having a plurality of slots 10s in alignment relative to each other as a number of sheet metal stator laminations are joined to form an assembly relative to which a plurality of wound coil portions are placed to be active or used during operation of the motor at all times so that all copper is active always.

One possible winding in accordance with the present invention and as illustrated in FIGURE 1 of the drawings designed to give two or four-pole operation includes wound coil portions such as identified by Roman numerals I, II, III and IV. Stators can be provided having differing numbers of slots into which coil portions are fitted.

In accordance with the present invention, a dynamoelectric machine is provided with a winding having individual equally-spaced wound collectively-formed poles, referred to as coil portions, numbering, per phase, a common multiple, usually the least common multiple, of each of the "n" number of poles at which the motor is to operate electrically which can be referred to by a letter "m." For optimum running operation of a polyspeed induction motor wherein all stator conductor material is active for every mode of operation, it has been found that each coil portion of a winding in accordance with the present invention should span or subtend a $360°/m$ arc. For optimum single-phase starting operation each coil portion should subtend an arc greater than $360°/m$. The coil portions of a single winding fitted relative to a stator must be connected for operation as an "$n$"-pole motor by dividing the coil portions, per phase, into $n$ groups, each group consisting of $m/n$ adjacent like polarity coil portions. Starting of single-phase motors is accomplished by establishing phase-shift relationship in a portion of the winding. For example, starting can be accomplished by connecting the phase-shifting means such as a capacitance relative to a series combination of right-hand coil portions of each group. For $m$-pole starting, phase-shift can be effected by using fractional coil portions. Operation is feasible at any number of poles which is an even integral factor of $m$ and $2m$ poles by consequent pole connection of all coil portions. Thus, a multi-speed motor in accordance with the present invention can be provided with a plurality of coil portions electrically connectable relative to each other to provide speed ratios and electrical relationships due to connections for a two-to-one pole ratio. An example of another embodiment of the present invention involving ratios other than 2 to 1 would be a 4 to 6 pole ratio available in a dynamoelectric machine as described in U.S. Patent 2,989,654—Neyhouse et al., issued June 20, 1961.

In Patent 2,989,654 there is a disclosure related to a four-six pole dynamoelectric machine having a single winding including coil portions one through twelve which are fitted into slots of a stator assembly in two or more layers such that a double overlapping of ends of the coil portions occurs relative to each other and electrical poles are defined by summation of flux forces induced by flow of electrical current in conducting material of all of the coil portions at all times.

A single winding having only four concentric wound coil portions is illustrated in FIGURE 1. The coil portions as mentioned earlier are identified by Roman numerals I, II, III and IV in FIGURE 1. Coil portion I, for example, is formed to have a radially outer sector located deep in slots 1 and 16. The span of each of the coil portions in the embodiment of FIGURE 1 is equivalent to the arcuate distance between slots 1–16. Each of the coil portions in the embodiment of FIGURE 1 includes a total of six concentric sectors or segments. It is to be noted that the coil portions I, II, III, and IV are alternately located in positions radially inwardly and radially outwardly relative to the slots per se. As indicated above, more than four coil portions can be provided. A total of six leads is brought out from the four coil portions in the embodiment of FIGURE 1. The stator for the embodiment of FIGURE 1 has thirty-two slots and the elements of the single winding winding are adapted to be connected as a nonreversible two-four pole motor.

Figure 1A:
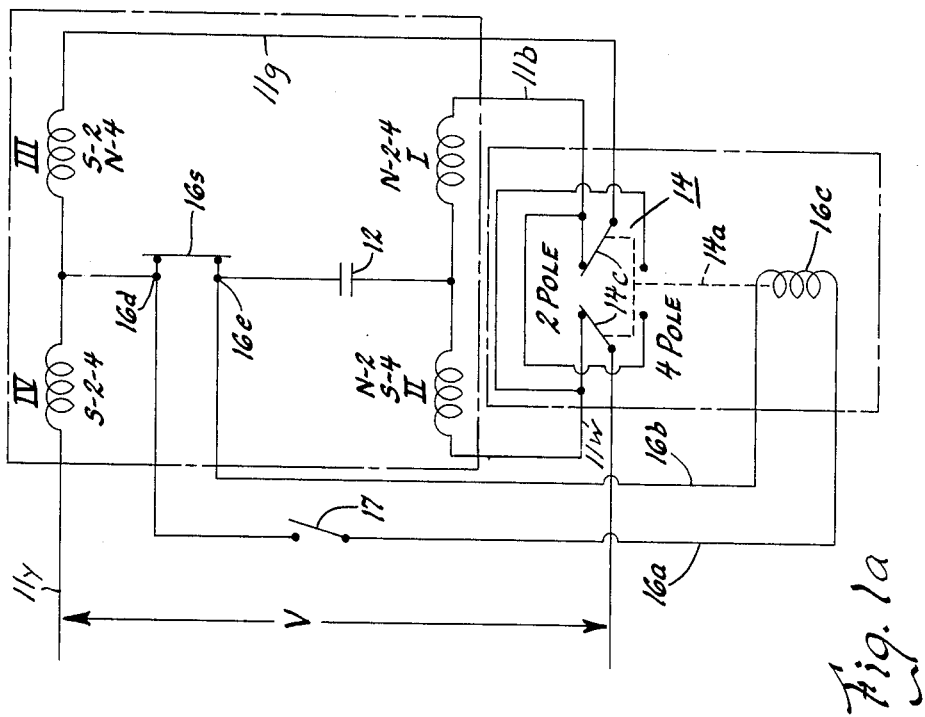
FIGURE 1a illustrates a control circuit for use with the machine of FIGURE 1.

FIGURE 1a represents both a control circuit and wiring diagram to illustrate connections of leads from the winding coil portions shown in FIGURE 1 and adapted to be connected relative to a phase shifting means or capacitor 12. It is to be understood that a resistance or reactance can be used in place of the capacitance identified by numeral 12. FIGURE 1a illustrates a control circuit for use with the machine of FIGURE 1 and connections to reverse current flow in predetermined coil portions due to energization from a source of line voltage are established by means of a double pole double throw switch generally indicated by numeral 14. A starting relay which can be a centrifugal switch is shown in FIGURE 1a and includes a relay coil 16 adapted to be energized through a pair of leads 16a and 16b connected to centrifugal switch contacts 16d and 16e respectively. A speed selector switch indicated by numeral 17 is provided as shown relative to lead 16a and can be closed for four pole operation. The double pole double throw relay 14 is operated and energized through coil 16c when starting switch 16s is open and the speed selector switch 17 is closed for four pole running operation. During four pole running operation the leads 11y and 11b from coil portions I and IV are connected to a source of line voltage. A lead 11g is connected to a lead 11w by way of relay 14 for four pole operation. Thus, in effect, for four pole running the coil portions I, II, III and IV are connected in series and produce instantaneous polarities of n-s-n-s (north and south), alternately around the stator. For two pole operation both of the leads 11y and 11w are connected to a source of line voltage but leads 11g and 11w are connected differently by the double pole double throw switch 14 having contact arms adapted to be positioned relative to a two pole connection whenever the speed selector switch 17 is open and/or switch 16s is closed between contacts 16d and 16e. For the two pole connection the leads 11g and 11b are connected to each other such that a series circuit is established from the lead 11w to coil portion II to coil portion I to coil portion III to coil portion IV to the lead 11y. A centrifugal switch contact arm or shorting bar 16s is adapted to bridge and close a circuit directly across the contacts 16d and 16e, for attaining two pole starting operation. In accordance with the circuit shown in FIGURE 1a, a shift in the phase of current in coil portions I and III is established by connecting the phase shifting means such as capacitance 12 in parallel relative to the series connected coil portions I and III. Upon reaching a predetermined speed, the switch contact arm 16s of the motor is caused to open the circuit across the contacts 16d and 16e so as to permit running operation of the motor as a two pole motor utilizing coil portions II and I in series to produce an effective north polarity electrical pole and coil portions III and IV to produce an effective south polarity electrical pole. With starting switch 16s open between contacts 16d and 16e closure of the speed selector switch 17 can effect four pole running motor operation because a limited current will flow through coil 16c and phase shifting means or capacitor 12 in series sufficient in magnitude to effect movement of an armature 14a of the double pole double through switch relative to the coil 16c for causing movement of the contact arms 14c of the double pole double throw switch 14 to a four pole running connection position as in FIGURE 1a. Regardless of the position of speed selector switch 17, starting is always accomplished with the motor connected for two pole starting, switch 16s causing the speed selector relay to remain deenergized until said switch 16s opens, at which time the motor either remains connected for two pole running or transfers to four pole running connection in response to the selection provided by speed selector by speed selector switch 17 in conjunction with the speed selector relay 16c. The coil portions in the top and bottom of slots shown in the working model stator of FIGURE 1 are wound using a #20 wire having thirteen turns for each of six sectors per element. As indicated in FIGURE 1a, the coil portions I and IV have the same polarity for both two and four pole connection. The polarities for coil portions I and IV are n and s, north and south respectively. Coil portion III has a south polarity for two pole operation and a north polarity for four pole operation while coil portion II has a north polarity for two pole operation and a south polarity for four pole operation.

FIGURE 2a illustrates a control circuit and wiring diagram for use with the machine similar to that of FIGURE 1 though utilizing seven leads thereto and reversible in operation. A pair of leads are connected to a source of line voltage for both two and four pole operation as indicated in the control circuit of FIGURE 2a. For two pole operation, the leads 21g and 21y as well as leads 21x and 21b, respectively, are connected to each other setting a double pole double throw switch 24 to a two pole position. For four pole operation, leads 21b and 21y as well as leads 21g and 21x, respectively, are connected to each other by setting the double pole double throw switch 24 to a four pole position by location of contact arms 24c in the four pole position in FIGURE 2a. A single pole single throw switch 25 is provided and when connected to a position relative to coil portion I as shown in FIGURE 2a, the circuit at starting will result in counterclockwise rotation of the dynamoelectric machine. Conversely, when the single pole single throw switch is connected to coil portion IV or to the left in the view of FIGURE 2a, clockwise rotation is obtained at starting. A speed selector switch 27 connected with a relay coil 26c by means leads 26a and 26b can be closed to effect four pole operation due to energization of the solenoid and movement of an armature 24a affected thereby to shift positions of the speed selector, double pole double throw switch. As shown in the nonenergized position, two pole operation is indicated. When the speed selector switch 27 is closed to select four pole running, a circuit is closed through a phase shifting means 22 connected to a lead 21r which provides a tap-in connection between coil portions II and III provided starting switch arm 26s is open between contacts 26d and 26e. For two pole running operation, the speed selector switch 27 is open and the circuit across contacts 26d and 26e is opened by a switch arm 26s which is part of a centrifugal switch provided relative to the motor in a well-known manner. The phase shifting means or capacitor 22 is connected in parallel across coil portions I and III for effecting starting in a counterclockwise direction and the phase shifting means is connected in parallel across coil portions II and IV for starting in a clockwise direction. Suitable leads are connectable by way of the double pole double throw switch 24 to obtain circuit connections for two and four pole operations as described above. Regardless of the position of speed selector switch 27, starting is always accomplished with the motor connected for two pole starting, switch 26s causing the speed selector relay to remain deenergized until said switch 26s opens, at which time the motor either remains connected for two pole running or transfers to four pole running connection in response to the selection provided by speed selector switch 27 in conjunction with the speed selector relay 26c. Each of the coil portions of the single winding is formed using a #20 wire size including thirteen turns per sector for each of six sectors forming each coil portion.

FIGURE 3 is a plan view of a stator and coil assembly along with a diagrammatic representation of connections relative thereto for a twenty-four slot, five lead, reversible parallel wound, two-four pole dynamoelectric machine in accordance with the present invention. A stator generally indicated by numeral 30 is provided with a total of twenty-four radially inwardly extending slots 30s which are aligned relative to each other as represented by a groove 30g located along a radially outer periphery of the stator 30. Winding coil portions covering an arcuate distance between slots 1–12, 7–18, 13–24 and 19–6 are identified by Roman numerals I, II, III and IV. Each coil portion is formed to have a total of five concentric sectors or segments each of which includes thirty-two turns of #19 wire size. FIGURE 3a illustrates a control circuit for use with the machine of FIGURE 3. It is noted that the embodiment of FIGURE 3 provides a single winding having a plurality of identical coil portions uniformly and symmetrically distributed relative to twenty-four slots and from which only five leads are brought out. Series parallel connections are established for the coil portions relative to each other. As illustrated, leads 31a and 31y are connected to a source of power or line voltage and directly to coil portions I and IV at all times. Coil portions II and III are alternately connected to leads 31a and 31y respectively. For two pole operation, lead 31w is connected to lead 31y and for four pole operation lead 31w is connected to lead 31a.

A lead 31r provides a connection relative to a phase shifting means such as a capacitor 32. A double pole double throw switch generally indicated by numeral 34 is provided in the circuit and includes contact arms 32c which can be moved in pairs to provide either two pole or four pole running speed selection. The illustration in FIGURE 3a shows the arms 34c in two pole position. An armature 34a of a relay having a coil 36c is adapted to be moved for effecting positioning of the arms 34c to establish connection of lead 31y to lead 31w for two pole operation or to lead 31g for four pole operation. Positioning of the arms 34c for four pole connection also establishes connection of the lead 31a to a wire means 31w which for two pole connections is electrically connected to lead 31y. The coil 36c is connectable by way of leads 36a and 36b relative to terminals or contacts 36d and 36e. A speed selector switch 37 is provided in line 36a and this switch when closed, effects a completion of a circuit through the phase shifting means or capacitor 32 by way of the lead 31r to energize coil 36c when stator switch 36s is open. A connection can be completed through this lead relative to the phase shifting means or capacitor 32 by way of a bridging arm or switch member 36s of a centrifugal switch. The centrifugal switch is closed only during starting operation and remains open during two pole running and four pole running operation. A single pole double throw switch 35 can be positioned to the left or to the right to establish counterclockwise or clockwise rotations respectively. For two pole operation, the arms 34c of the double throw switch 34 remain in the two pole position with relay coil 36c deenergized such that leads 31y and 31w are connected to one side of a source of line voltage and further leads are connected to an opposite side of a source of line voltage. Coil portions II and IV are thus connectable in parallel with each other during the two pole starting and running operation and coil portions I and III are connectable in parallel with each other. The phase shifting means or capacitor 32 can be connected in parallel with either group for clockwise or counterclockwise operation by positioning of the switch 35 to the left or to the right as indicated in FIGURE 3a. The polarities of the coil portions are indicated by letters N and S, north and south, respectively in the views of FIGURE 3a. The coil portion I has a north polarity both during two pole and four pole operation while the coil portion IV has a south polarity during both two pole and four pole operation. Coil portion II has a north polarity for two pole operation and south polarity for four pole operation. Coil portion III has a south polarity for two pole operation and a north polarity for four pole operation. Regardless of the position of speed selector switch 37, starting is always accomplished with the motor connected for two pole starting, switch 36s causing the speed selector relay to remain deenergized until said switch 26s opens, at which time the motor either remains connected for two pole running or transfers to four pole running connection in response to the selection provided by speed selector switch 37 in conjunction with the speed selector relay 36c.

FIGURES 4 and 4a illustrate diagrammatically another embodiment for starting and running connections respectively, for coil portions of a dynamoelectric machine having a winding in accordance with the present invention. FIGURE 4 shows a circuit for establishing starting operation in which coil portions I, III and portions of coils II and IV are connected in series relative to each other. In accordance with the embodiment of FIGURE 4, both coil portions II and IV are wound using a pair of parallel wires such that portions of each of these individual coils are located adjacent to each other relative to slots of a twenty-four slot or thirty-two slot stator for example. Series connections of the poritions of coils II and IV are then connected in series such that a portion of coil II identified as portion II–A is in series with a portion of coil IV identified as portion IV–A which, in turn, is in series with portion II–B in series with portion IV–B. A centrifugal switch contact 46s is adapted to close a connection whereby a phase shifting means or capacitance 42 is connected in parallel relative to the four series connected portions of coil portions II and IV. The identification of coil portions I–II–III–IV coincide with the number of coil portions and the branches or portions of coils II and IV are all connected in series with each other. Improved starting torque per ampere of current applied to these branches or portions of coil II and IV is obtained by the connection shown in FIGURE 4. Thus, greater starting torque is obtained using the same value of phase shifting means or capacitance as was used in the embodiment of FIGURE 1. The turns ratio of the capacitor shunted branches or portions of coils or coil portions II and IV as compared with the coils I and III is 2 to 1 for starting duty. FIGURE 4a illustrates parallel connections of series internal connections between portions or branches II–A and IV–A in series relative to each other and in parallel relative to series connected portions or branches II–B and IV–B. The centrifugal starting switch arm 46s is shown in an open position whereby the phase shifting means or capacitance 42 is not connected in parallel relative to these portions or branches of coil portions II and IV. All conducting material of all portions or branches of all coil portions is active at all times. It is to be understood that the wire size used for winding parallel portions of each of the coil portions II and IV need not be the same and then further modification of the starting torque is available.

FIGURE 5 illustrates another embodiment for starting a motor in accordance with the present invention. In FIGURE 5 each of the coil portions has parallel wound portions identified by letters A and B associated with coil portions I, II, III and IV. In the embodiment of FIGURE 5, parallel wound portions A and B of each of the coil portions are connected in series. Also, coil portion I has portions I–A and I–B connected in series with parallel wound portions III–A and III–B of coil portion III. Similarly, parallel wound portions II–A and II–B of coil portion II are connected in series with portions IV–A and IV–B of coil portion IV. Thus, coil portions I and III are in series with each other to form north and south polarities respectively, while coil portions II and IV are in series with each other also to form north and south polarities. It is to be understood that the embodiment of FIGURE 5 illustrates two pole starting and thus a phase shifting means or capacitance indicated by numeral 52 is connectable in series through a centrifugal switch arm 56s. The leads are provided such that the phase shifting means 52 can be connected in parallel relative only to portions II–B and IV–A. It is to be understood that different wire sizes can be used for the portions of each of the coils wound in parallel with respect to each coil and thus further modification of starting torque can be obtained. Coil portions I–III and II–IV can have individual portions of each in series with each other but the over-all connection must be in parallel as shown in FIGURE 5 so as to obtain angular difference in currents in at least two portions of a pair of differing coil portions for phase shift necessary to obtain starting torque. Once the centrifugal switch operates, the motor in accordance with the present invention can run at the same number of poles as used for starting. A two pole high single speed operation is thus obtained.

FIGURE 6 illustrates another embodiment in which a pair of conductors or wires are wound in parallel for each coil portion of a single winding in accordance with the present invention. The wires can be or need not be the same size relative to each other. Coil portions II and IV have portions A in series with each other and portions B in series with each other all connectable in parallel relative to coil portions I and III after a normally open centrifugal switch indicated by numeral 66s closes a circuit through the portions II–B and IV–B. The polarities of coils are as indicated in the view of FIGURE 6.

FIGURES 4, 4a, 5 and 6 showing connection for single speed starting and running are adaptable to multi-speed running operations as in FIGURES 2b and 3b by addition of switching means to effect reversal of connections in coil portions II and III.

Similar winding and connection techniques can be applied to generators in order to achieve operation with more than one number of poles.

While the embodiments of the present invention as here disclosed constitute preferred forms, it is to be understood that other forms might be adopted.

What is claimed is as follows:

1. In a single-phase dynamoelectric machine stator wiring connection arrangement positioned in multiple slots of a magnetic core, the improvement which comprises a first pair of coil portions in series with each other and a further pair of coil portions, said first and further pairs of coil portions as a winding arrangement together being entirely energized at all times during both starting and running operation, and switching means as well as a phase shifting means therewith that is removably connected in parallel with said further pair of coil portions and that is used only during starting operation, said further coil portions having wiring per se thereof physically wound at least in pairs in parallel for each coil portion though simultaneously and conversely all series connected electrically during starting operation, said wiring per se during running operation remaining physically wound at least in pairs in parallel for each of a pair of coil portions though simultaneously electrically connected at least in pairs in parallel with each other as wiring per se of each such coil portion remains electrically in series with a corresponding part of the other coil portion, all of said coil portions being entirely energized at all times during both starting and running operation regardless of use thereof electrically in both series and parallel relationships per se though predetermined coil portions always remain physically wound at least in pairs in parallel for the same as well as differing wiring sizes.

2. In a single-phase dynamoelectric machine stator winding connection arrangement positioned in multiple slots of a magnetic core, the improvement which comprises a first pair of coil portions arbitrarily identified by Roman numerals I and III electrically in series with each other and a further pair of coil portions having wiring per se thereof physically wound at least in pairs in parallel identifiable arbitrarily as coil portions II–A and II–B as well as coil portions IV–A and IV–B, said coil portions I and III during starting having all series connection with coil portions II–A, IV–A, II–B and IV–B, and switching means as well as a phase shifting means such as capacitance removably connected in parallel with only coil portions II–A, IV–A, II–B and IV–B during starting operation, said coil portions during running operation without phase shifting means having coil portions II–A and IV–A electrically in series and coil portions II–B and IV–B electrically in series, said series-connected II–A with IV–A being in parallel connection to series-connected II–B and IV–B which together are then collectively energized in series with series-connected coil portions I and III, all of said coil portions being energized at all times during both starting and running operation regardless of use of predetermined coil portions II–A, IV–A, II–B and IV–B in both series and parallel electrical relationships though always remaining physically wound at least in pairs in parallel irrespective of wiring size.

References Cited by the Examiner
UNITED STATES PATENTS

| | | | |
|---|---|---|---|
| 2,606,311 | 8/52 | Burian | 318—220 |
| 2,813,239 | 11/57 | La Cour | 318—224.1 |
| 2,817,050 | 12/57 | La Cour | 318—224.1 |
| 2,836,780 | 5/58 | List | 318—221 X |
| 3,031,606 | 4/62 | Cantonwine | 318—224.1 |
| 3,068,389 | 12/62 | Cantonwine | 318—220 |

ORIS L. RADER, *Primary Examiner.*

JOHN F. COUCH, *Examiner.*